May 23, 1933.  E. J. BURNHAM ET AL  1,911,055
PROTECTIVE SYSTEM
Filed June 8, 1931
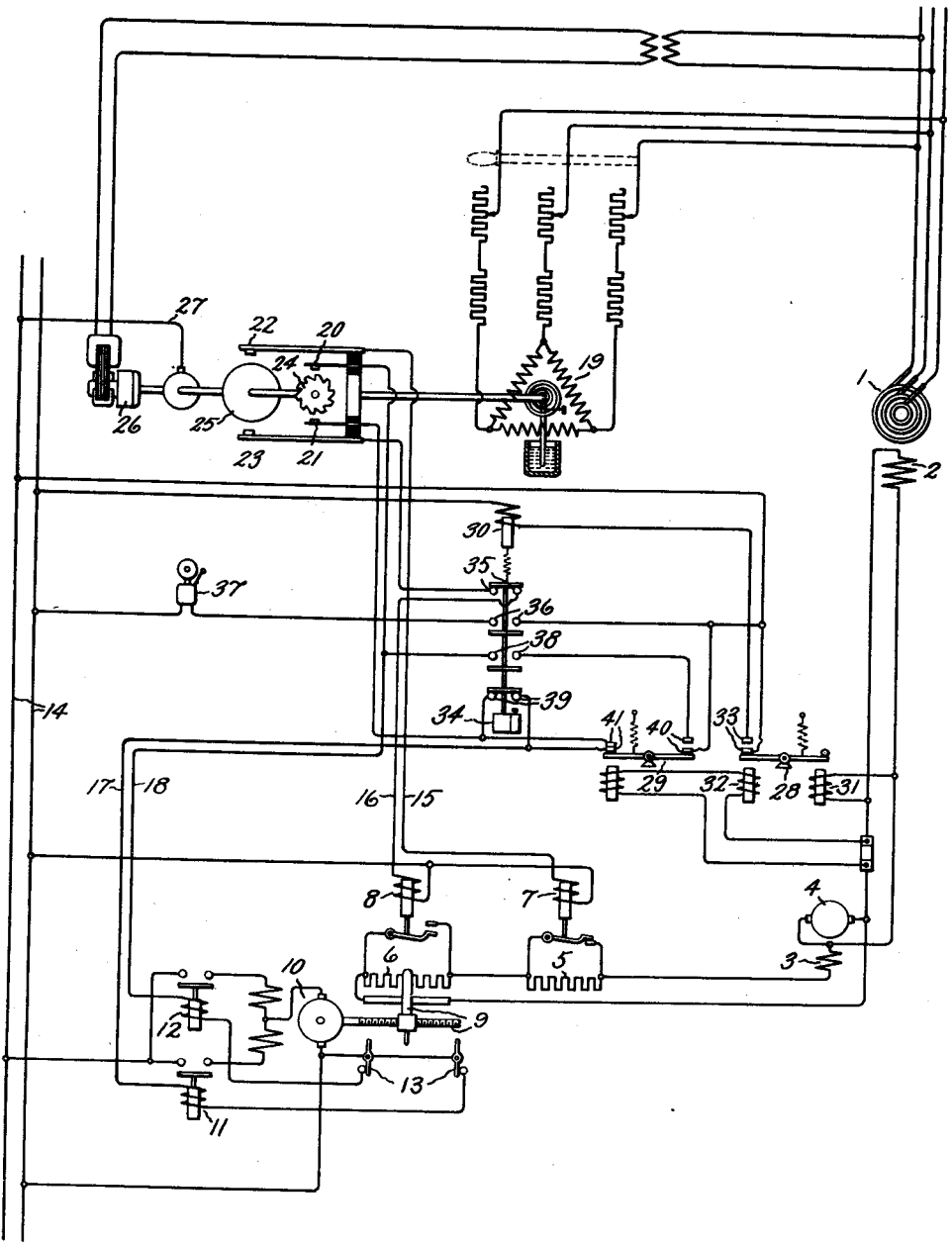
Inventors:
Elmer J. Burnham,
Robert N. Slinger,
by Charles E. Tullar
Their Attorney.

Patented May 23, 1933

1,911,055

UNITED STATES PATENT OFFICE

ELMER J. BURNHAM, OF SCOTIA, AND ROBERT N. SLINGER, OF SCHENECTADY, NEW YORK, ASSIGNORS TO GENERAL ELECTRIC COMPANY, A CORPORATION OF NEW YORK

PROTECTIVE SYSTEM

Application filed June 8, 1931. Serial No. 542,800.

Our invention relates to electrical protective systems and particularly to systems for indicating a hot field in a dynamo-electric machine and for limiting the temperature rise of the field winding of a dynamo-electric machine.

It not infrequently happens that, due to high excitation conditions, or for other causes, the field winding of a dynamo-electric machine attains such high temperatures that its insulation is injured and even burning out of the field winding itself may sometimes occur. Such conditions are particularly likely to occur when large synchronous machines are controlled by a voltage regulator. For example, when a large synchronous machine is acting as a synchronous condenser to regulate the voltage of a transmission line, or system, by drawing variable amounts of leading or lagging current through the line reactance, it will sometimes occur that the machine will have to be operated overexcited, that is to say with large excitation, for considerable periods of time. If now the design is faulty, or the cooling arrangement for the machine is defective in any way, it is very likely that under such conditions the field winding will attain a dangerously high temperature. The principal cause of overheating of most machines, however, is overloading and this is a condition which is likely to be encountered on any system. Overloading is very apt to occur when the system voltage is abnormally low immediately following a system disturbance, or at times when the system load demands excessive amounts of wattless current. On systems where there is not enough synchronous condenser capacity to maintain a fixed voltage level at all times, the machine may be overheated by the carelessness or neglect of an attendant in failing to limit the loading of the machine.

We have found that the voltage regulator described and claimed in a copending application of Louis W. Thompson, Serial Number 478,463, filed August 28, 1930, and assigned to the assignee of the present application, is well adapted for regulating the voltage of large synchronous machines. This regulator acts to control the excitation of the regulated machine in the following manner: On relatively small deviations from normal of the voltage, the regulator acts to produce relatively slow compensating changes in excitation of the regulated machine, while on relatively large deviations from normal of the voltage the regulator acts to produce relatively quick and large changes in the excitation of the regulated machine. This regulator is provided with anti-hunting means for producing a relatively rapid intermittent action of all of these regulating features at a uniform rate, which, however, is such that the ratio of the time of action to the time of inaction of these features varies in proportion to the deviations from normal of the regulated voltage.

The protection of a field winding of a dynamo-electric machine which is controlled by such a regulator obviously presents special problems and in accordance with our invention we provide protective means which is especially adapted for use in connection with dynamo-electric machines which are governed by such a regulator. More particularly we provide means having a time delayed action for simultaneously incapacitating the means for producing quick increase in excitation and for giving a signal upon the occurrence of a hot field winding, and additional means operative in the above manner and under the above condition to incapacitate the means for producing relatively slow increases in excitation and for causing the regulator to produce relatively slow decreases in excitation provided the field current is above a predetermined maximum value.

An object of our invention is to provide an improved protective and indicating system for the field winding of a dynamo-electric machine.

Another object of our invention is to provide an improved protective and indicating system for the field winding of a dynamo-electric machine which is controlled by a voltage regulator.

A further object of our invention is to provide an improved protective and temperature indicating system for the field winding of a dynamo-electric machine which is provided with a voltage regulator having relatively quick and slow acting means for controlling the excitation of said field winding.

Our invention will be better understood from the following description, taken in connection with the accompanying drawing and its scope will be pointed out in the appended claims.

In the single figure of the accompanying drawing, wherein we have shown diagrammatically an embodiment of our invention, a regulated dynamo-electric machine 1, which will be considered to be a synchronous condenser, has a field winding 2 whose excitation is controlled by varying the excitation of a field winding 3 of an exciter 4, across which the main field winding 2 is connected. The excitation of field winding 3 is controlled by a pair of resistances 5 and 6. The effective value of resistance 5 is varied by a relay 7 which normally short circuits it and which when energized removes the short circuit about this resistance thereby suddenly inserting a relatively large resistance in the field circuit, thereby decreasing its excitation. Relay 7 will therefore be referred to as the quick lower relay. Resistance 6 is varied by two different means. One of these means is a normally open relay 8 which is arranged to short circuit this resistance when operated. This relay therefore acts to quickly cut out a relatively large resistance in the field winding circuit of the exciter thereby to produce relatively quick increases in excitation. Consequently relay 8 will be referred to as the quick raise relay. The other way of varying resistance 6 is by rheostatic means 9 which is operated by a reversible servo-motor 10. The direction of operation of motor 10 is controlled by relays 11 and 12 respectively. These relays, whose energizing circuits are completed through limit switches 13 associated with rheostatic means 9, control motor 10 in such a way as respectively to cause relatively slow decreases and increases in the resistance 6 and consequently relatively slow increases and decreases respectively in the excitation of field winding 3. As will be seen by an inspection of the drawing, relays 7, 8, 11 and 12 are all connected to one side of a suitable supply bus 14, while their connections to the other side of this control bus are controlled by the voltage responsive means of the regulator through conductors 15, 16, 17 and 18 respectively.

The voltage responsive means of the regulator consists of a spring biased three phase torque motor 19 which is connected to machine 1 so as to produce a net unbalanced counter-clockwise torque, as viewed in the drawing, when the voltage of machine 1 rises and to produce a net unbalanced clockwise torque when the voltage of machine 1 decreases, below a predetermined normal value. Arranged to be operated by this motor 19 is a circuit controller comprising a pair of resiliently mounted contacts 20 and 21, which are the slow lower and raise contacts respectively, and which are connected to conductors 18 and 17, respectively and a pair of relatively rigidly mounted contacts 22 and 23, which are the relatively quick lower and quick raise contacts, respectively, and which are connected to conductors 15 and 16 respectively. The anti-hunting means for the regulator consists of an irregular surfaced star wheel 24 and a smooth surfaced wheel 25 which are arranged to be rotated at a uniform speed by a small motor 26, which is preferably a small synchronous motor, such as is employed for operating electric clocks. The contacts are so arranged that upon small deviations from a normal value of the voltage of machine 1 contact 20 or 21 engages star wheel 24 whereby intermittent impulses are sent through conductors 17 and 18 from the control bus 14, through a suitable connecting conductor 27. As the value of the deviation increases the ratio of the time of energization of conductors 17 or 18 to the time of their deenergization increases. At a predetermined value of deviation contact 22 or 23 engages wheel 25 thereby sending intermittent impulses through conductors 15 or 16. Due to the resilient mounting of contacts 20 and 21, the ratio of the time of energization of these latter conductors to the time of their deenergization will also vary in proportion to variations in the deviation from normal of the regulated condition.

From the above description the operation of the regulator will be obvious because the impulses in conductors 17 or 18 will through relays 11 or 12, cause intermittent operation of motor 10 in the proper direction to vary the resistance 6 in such a way as to produce relatively slow compensating changes in the excitation of field winding 3. Also when the deviation of the voltage from normal exceeds the predetermined amount, the impulses in conductors 15 or 16 will cause intermittent operation of relatively quick acting lower and raise relays 7 or 8 whereby relatively quick and large compensating changes are produced in the excitation circuit of field winding 3 of exciter 4.

The protective and indicating features of our invention comprise three separate and distinct control elements. These are an element or relay 28 which operates in accordance with a function of the temperature of field winding 2 of main machine 1, an element or relay 29 which operates in accordance with the field current of machine 1 and a time delayed acting element or relay 30 whose operation is controlled by the temperature responsive relay 28. It is immaterial to our invention, in its broader aspects, how the field temperature relay is controlled and in the illustrated embodiment we have shown relay 28 as arranged to respond to the electrical resistance of field 2, which will also be a response to the field temperature as the field resistance is a function of its temperature. As shown, this relay includes a pair of differentially acting magnets 31 and 32 which respond respectively to the voltage drop across field 2 and the current in field 2. This relay is provided with a pair of normally open contacts 33 and is so arranged that if the ratio of the voltage to the current of field winding 2 is below a predetermined amount these contacts will be held open. As this ratio corresponds to the resistance of winding 2 and as the resistance is a function of the temperature of the winding, it is obvious that when the temperature exceeds a predetermined value the ratio of the pull of coil 31 to the pull of coil 32 will attain such a value that 31 will overpower 32 and cause closure of contacts 33. These contacts when closed complete an energizing circuit for operating time delay relay 30. The reason that time delay means, such as a dashpot 34, are associated with relay 30 is that this prevents useless operation of the control relay 30 upon momentary sudden increases in excitation of winding 2. During such sudden increases the voltage across the winding 2 is likely to go up to relatively high values before the current, which is retarded by the field inductance, can attain corresponding values and consequently relay 33 will operate, momentarily, at times when the field winding 2 is really not at a dangerously high temperature.

The operation of relay 30 causes the opening of a set of its contacts 35 which are in conductor 16. This conductor controls the quick raise or increase means for the excitation of the regulated machine. At the same time, operation of relay 30 causes the closure of a pair of contacts 36, which complete an energizing circuit from control bus 14 through a signal 37. Also it causes the closure of a pair of contacts 38 and the opening of a pair of contacts 39 which control respectively the means for producing relatively slow decreases in excitation and the means for producing relatively slow increases in excitation. However, the circuits which are controlled by contacts 38 and 39 are also under the joint control of current relay 29.

Relay 29 has a pair of normally open contacts 40 which are in series with contacts 38 of relay 30 and a pair of normally closed contacts 41 which are in parallel with contacts 39 of relay 30. This relay 29 is arranged to close its contacts 40 and open its contacts 41 when the field current of machine 1 exceeds a predetermined maximum value, which it will be assumed is normal full load excitation.

As shown in the drawing, the current coils of relays 28 and 29 are connected to an instrument shunt in the circuit of field winding 2. However, it will be obvious to those skilled in the art that our invention is not limited to such an arrangement and that any other equivalent means of energizing these current coils in accordance with the field current, may be employed. For example, if exciter 4 is a compound wound machine, or a machine having an interpole series field winding, these current windings may be connected across the series winding without departing from our invention. Furthermore, our invention is not limited to operating a current relay 29 in accordance with field current and if desired this relay might be connected in any suitable and well known manner to respond to the main line current of machine 1. In most cases it is preferable to have current relay 29 operate in response to the field current, but it is conceivable that there might be special cases where it would be better to have this relay operate in accordance with the armature current of machine 1.

It will now be seen that upon the operation of relays 29 and 30, the closure of contacts 38 and 40 will complete a circuit which is in parallel with a circuit completed by contacts 20—24 of the regulator. Consequently the relatively slow acting, excitation lowering means will be put into operation. Also, the concurrent opening of contacts 39 and 41, which corresponds to the concurrent conditions of a hot field carrying a current which is above a predetermined value, causes the circuit through conductor 17 to be broken thereby incapacitating the relatively slow acting means for producing increases in the excitation of the regulated machine.

The reason that the relatively slow acting raise and lower means of the regulator are controlled by the joint action of the field temperature and field current responsive means is that it is usually undesirable to modify the voltage control of these means whenever the field winding 2 gets too hot and consequently this control is only modified during the extreme conditions represented by a hot field which is carrying an abnormally high current. Under such extreme conditions the modification of the voltage control is such that the slow acting raise means is entirely taken out of service, while the slow acting lower means is put under the joint control of the voltage responsive means and the field current limiting means.

The operation of our invention should now be clear to those skilled in the art. The action of the voltage regulator has already been described in detail and it will be assumed that machines 1 and 4 are operating in the ordinary manner and that the voltage regulating means is acting in the manner which has been described to hold substantially constant voltage. If now the temperature of field winding 2 becomes abnormally high, as for example, when machine 2, which it will be remembered is preferably a synchronous condenser, has been operating for a relatively long time in an overexcited condition, relay 28 will operate thereby causing the operation of time delay relay 30. Through contacts 35 of this latter relay the means for producing forcing or rapid increases in excitation is incapacitated, as this is the means which is most likely to produce damage to the field winding when it is hot and at the same time signal 37 is operated by the closing contacts 36. If now field 2 is carrying an abnormally high current, current relay 29 will operate with the result that the action of the regulating means is so modified that the excitation of the regulated machine is automatically decreased, regardless of the voltage of the machine 1, and at the same time the relatively slow acting means for increasing the excitation of the regulated machine is incapacitated, so far as its response to voltage is concerned, for were this not done it is conceivable that both fields of motor 10 would be simultaneously energized with the result that this motor would not operate at all. That is to say, if the joint action of the field temperature and the field current responsive means is to act in a reliable manner to reduce the excitation of the machine when its field winding is both too hot and is carrying an excessive current, there must also be provision for preventing the operation of the slow raise means of the regulator in response to the voltage of the main machine, for it is conceivable that under the above noted extreme conditions that the voltage might be low with the result that the voltage responsive element of the voltage regulator would tend to cause operation of the quick raise means of the regulator.

We have found that this arrangement is substantially independent of differences in the ambient temperatures of field winding 2 and of the means which gives a measure of the current flowing in this winding.

While we have shown and described a particular embodiment of our invention, it will be obvious to those skilled in the art that changes and modifications may be made without departing from our invention and, we therefore, aim in the appended claims to cover all such changes and modifications as fall within the true spirit and scope of our invention.

What we claim as new and desire to secure by Letters Patent of the United States, is,—

1. The combination, with a dynamo-electric machine having a field winding, of means operative in accordance with a function of the temperature of said winding for limiting said temperature to a predetermined maximum value, and a time delay device for delaying the operation of said means.

2. The combination, with a dynamo-electric machine having a field winding, of a voltage regulator for said machine which varies the energization of said field winding in accordance with variations in the voltage of said machine, means operative in accordance with a function of the temperature of said field winding for modifying the action of said regulator when the temperature of said field winding exceeds a predetermined maximum value, and a time element device for delaying the action of said means.

3. The combination, with a dynamo-electric machine having a field winding, of a voltage regulator associated with said machine for varying the energization of said field winding in accordance with the voltage of said machine, means responsive to a function of the temperature of said field winding for modifying the action of said regulator when the temperature of said field winding exceeds a predetermined maximum value, and means responsive to the degree of energization of said field winding for modifying the action of said means which is responsive to a function of the field temperature.

4. The combination, with a dynamo-electric machine having a field winding, of means having a time delayed action for limiting the temperature of said field winding to a predetermined maximum value, and a device responsive to the current in said field winding for modifying the action of said means.

5. The combination, with a dynamo-electric machine having a field winding, of a voltage regulator for regulating the voltage of said machine through control of the energization of said field winding, and means responsive to a function of the temperature of said field winding for causing said regulator to decrease the excitation of said field winding a predetermined time after the temperature of said field winding has attained a predetermined maximum value.

6. The combination with a dynamo-electric machine having a field winding, of a voltage regulator for varying the energization of said field winding in accordance with the voltage of said machine, means operating in accordance with a function of the temperature of said field winding for limiting the action of said regulator, means operative in accordance with the energization of said field winding for limiting the operation of said first mentioned means, and a time delay arrangement for limiting the operation of both of said means.

7. The combination with a dynamo-electric machine having a field winding, of means for varying the excitation of said field winding, means operative in accordance with the electrical resistance of said field winding for decreasing the excitation of said field winding when its resistance attains a predetermined maximum value, and a time delay element for modifying the action of said means.

8. The combination with a dynamo-electric machine having a field winding, of a relay having a circuit controlling position and a pair of oppositely acting magnets, one of said magnets being energized in accordance with the current of said field winding, the other of said magnets being energized in accordance with the voltage across the field winding, said relay being arranged to assume its circuit controlling position when the effective pull of said voltage responsive magnet exceeds the effective pull of said current responsive magnet, and means operative when said relay assumes its circuit controlling position for controlling the energizaton of said field winding.

9. In combination, a dynamo-electric machine having a field winding whose resistance varies with its temperature, a signal, means including a circuit controller responsive to the resistance of said field winding for initiating operation of said signal when the resistance of said field winding is beyond a predetermined value, and time delay means for preventing operation of said signal until the resistance of said field winding remains beyond said predetermined value for a predetermined time.

10. The combination with a dynamo-electric machine having a field winding, of a voltage regulator having means for causing relatively quick increases in excitation of said field winding and means for producing relatively slow increases in excitation of said field winding, and means operative in accordance with a function of the temperature of said field winding for incapacitating said means for producing relatively quick increases in excitation of said field winding when the temperature of said field winding exceeds a predetermined maximum value.

11. The combination with a dynamo-electric machine having a field winding, of a voltage regulator connected to said machine, said regulator having means for producing relatively quick increases in excitation of said field winding, said regulator also having means for producing relatively slow increases in excitation of said field winding, and means operative in accordance with a function of the temperature of said field winding for incapacitating said means for producing relatively quick increases in excitation of said field winding a predetermined time after said field winding attains a predetermined maximum temperature.

12. The combination with a dynamo-electric machine having a field winding, of a voltage regulator having separate means for producing relatively quick and relatively slow increases in energization of said field winding, means operative in accordance with a function of the temperature of said field winding for incapacitating both of said means for producing relatively quick and relatively slow increases in excitation when the temperature of said field winding is above a predetermined value, and means operative in accordance with the energization of said field winding for preventing the incapacitation of said means for producing relatively slow increases in excitation when the field energization of said machine is below a predetermined maximum value.

13. The combination with a dynamo-electric machine having a field winding, of a voltage regulator having means for producing relatively quick and slow increases in excitation of said field winding, means operative in accordance with a function of the temperature of said field winding for incapacitating said first mentioned means when the temperature of said field winding is above a predetermined maximum value, means responsive to the current in said field winding for preventing incapacitation of said relatively slow increase in excitation means when the current in said field winding is below a predetermined maximum value, and time delay acting means associated with both of said last mentioned means.

14. The combination with a dynamo-electric machine having a field winding, of a voltage regulator associated with said machine, and means operative in accordance with a function of the temperature of said field winding for simultaneously preventing said regulator from increasing the excitation of said machine and for causing it to decrease the excitation of said machine when the temperature of said field winding exceeds a predetermined maximum value.

15. The combination with a dynamo-electric machine having a field winding, of a voltage regulator connected to said machine, means operative in accordance with a function of the temperature of said field winding for simultaneously preventing said regulator from increasing the energization of said field winding and for causing said regulator to decrease the energization of said field winding when the temperature of said winding exceeds a predetermined maximum value, and means having a time delayed action associated with said temperature responsive means.

16. The combination with a dynamo-electric machine having a field winding, of a voltage regulator connected to said machine for varying the excitation of said field winding, means operative in accordance with a function of the temperature of said field winding for simultaneously preventing said regulator from raising the excitation of said field winding and for causing said regulator to lower the excitation of said field winding, and means operative in accordance with the current of said field winding for preventing the regulator from lowering the excitation of said field winding until the current in said field winding exceeds a predetermined maximum value.

17. The combination with a dynamo-electric machine having a field winding, of a voltage regulator connected to said machine for varying the excitation of said field winding, means operative in accordance with a function of the temperature of said field winding for simultaneously preventing said regulator from increasing the excitation of said field winding and for causing said regulator to decrease the excitation of said field winding, means for preventing said temperature responsive means from causing said regulator to lower the excitation of said field winding when the current of said field winding is below a predetermined maximum value, and means for causing a time delay in the action of both of said last mentioned means.

18. The combination with a dynamo-electric machine having a field winding, of a voltage regulator connected to said machine, said regulator having separate means for producing relatively slow increases and decreases in the excitation of said field winding and relatively quick increases in the excitation of said field winding, and means operative in accordance with a function of the temperature of said field winding for incapacitating both said means for producing increases in the excitation of said field winding and for causing operation of said means for producing decreases in the excitation of said field winding.

19. The combination with a dynamo-electric machine having a field winding, of a voltage regulator connected to said machine, said regulator having separate means for producing relatively slow increases and decreases in the excitation of said field winding and relatively quick increases in the excitation of said field winding, and means operative in accordance with a function of the temperature of said field winding for incapacitating both said means for producing increases in the excitation of said field winding and for causing operation of said means for producing decreases in the excitation of said field winding, and means for causing a time delay in the action of said means which is responsive to a function of the temperature of said field winding.

20. The combination with a dynamo-electric machine having a field winding, of a voltage regulator connected to said machine, said regulator having relatively slow acting means for producing increases and decreases respectively in the energization of said field winding and relatively quick acting means for producing increases in the excitation of said field winding, means operative in accordance with a function of the temperature of said field winding for incapacitating both of said means for producing increases in excitation and for causing operation of said means for decreasing the excitation of said field winding, and means operative in response to the current in said field winding for preventing the incapacitation of said means for producing relatively slow increases in excitation and also for preventing the starting of the means for producing the relatively slow decreases in excitation of said field winding when the current of said field winding is below a predetermined maximum value.

21. The combination with a dynamo-electric machine having a field winding, of a voltage regulator connected to said machine, said regulator having relatively slow acting means for producing increases and decreases respectively in the energization of said field winding and relatively quick acting means for producing increases in the excitation of said field winding, means operative in accordance with a function of the temperature of said field winding for incapacitating both of said means for producing increases in excitation and for causing operation of said means for decreasing the excitation of said field winding, and means operative in response to the current in said field winding for preventing the incapacitation of said means for producing relatively slow increase in excitation and preventing the starting of the means for producing the relatively slow decreases in excitation of said field winding when the current of said field winding is below a predetermined maximum value, and time delay means for retarding the action of said means which is responsive to a function of the temperature of said field winding.

22. The combination with a synchronous dynamo-electric machine having a field winding, of means for regulating the voltage of said machine by varying the energization of its field winding, said means having separate means for producing relatively slow and relatively quick increases in excitation of said field winding and for producing relatively slow decreases in excitation of said field winding, a signal, a relay having a time delayed action, a relay which is connected to be actuated when the current of said field winding exceeds a predetermined maximum value, means actuated upon the operation of said time delay acting relay for preventing operation of the means for producing relatively quick increases in the excitation of said field winding and for operating said signal, and means operative upon the joint operation of said time delay relay and said field current responsive relay for preventing the operation of said means for producing relatively slow increases in excitation of said field winding and for causing the operation of said means for producing relatively slow decreases in the excitation of said field winding, and means operative in accordance with a function of a temperature of said field windings for controlling the operation of said time delay relay.

In witness whereof, we have hereunto set our hands.

ELMER J. BURNHAM.
ROBERT N. SLINGER.